US010593979B2

United States Patent
Chuy et al.

(10) Patent No.: US 10,593,979 B2
(45) Date of Patent: Mar. 17, 2020

(54) MEMBRANE ELECTRODE ASSEMBLY FOR A FUEL CELL, METHOD FOR PREPARING THE MEMBRANE ELECTRODE ASSEMBLY, FUEL CELL SYSTEM AND VEHICLE

(71) Applicants: Daimler AG, Stuttgart (DE); Ford Motor Company, Dearborn, MI (US)

(72) Inventors: Carmen Chuy, Burnaby (CA); Scott McDermid, Vancouver (CA); Kyoung Bai, Vancouver (CA); Tran Ngo, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 336 days.

(21) Appl. No.: 14/950,204

(22) Filed: Nov. 24, 2015

(65) Prior Publication Data
US 2016/0156054 A1   Jun. 2, 2016

(30) Foreign Application Priority Data

Nov. 28, 2014 (CA) ..................... 2872682

(51) Int. Cl.
*H01M 8/10* (2016.01)
*H01M 8/1004* (2016.01)
(Continued)

(52) U.S. Cl.
CPC ......... *H01M 8/1004* (2013.01); *H01M 4/861* (2013.01); *H01M 4/8636* (2013.01);
(Continued)

(58) Field of Classification Search
CPC .. H01M 8/1004; H01M 4/861; H01M 4/8636; H01M 4/8663; H01M 4/8828; H01M 2250/20
(Continued)

(56) References Cited

U.S. PATENT DOCUMENTS

2008/0206616 A1* 8/2008 Atanassova ............ C09D 11/30
429/479
2011/0027696 A1* 2/2011 Fay ..................... H01M 4/8642
429/524

(Continued)

FOREIGN PATENT DOCUMENTS

JP  2004186049 A * 7/2004
JP  2010251140 A * 11/2010

OTHER PUBLICATIONS

English translation of Fukuda, JP 2004-186049 A, Jul. 2004, Japan.*
(Continued)

*Primary Examiner* — Cynthia H Kelly
*Assistant Examiner* — Rashid A Alam
(74) *Attorney, Agent, or Firm* — Patent Central LLC; Stephan A. Pendorf (57) ABSTRACT

A membrane electrode assembly for a fuel cell, with a membrane, a catalyst layer (16) and a gas diffusion layer. The catalyst layer (16) has a first side facing the membrane and a second side facing the gas diffusion layer. In the catalyst layer (16) an ionomer content increases towards the membrane. The catalyst layer (16) has a first sublayer (22) in which catalyst particles (26) are coated with a first ionomer (28). The catalyst layer (16) further has a second sublayer (24) with a second ionomer (32) which is closer to the membrane than the first sublayer (22). Pores (30) are present at least between the coated catalyst particles (26). Further, a method for preparing such a membrane electrode assembly, a fuel cell system and a vehicle with a fuel cell system.

11 Claims, 4 Drawing Sheets

(51) Int. Cl.
 *H01M 4/88* (2006.01)
 *H01M 4/86* (2006.01)
(52) U.S. Cl.
 CPC ....... *H01M 4/8663* (2013.01); *H01M 4/8828* (2013.01); *H01M 2250/20* (2013.01); *Y02E 60/521* (2013.01); *Y02T 90/32* (2013.01)
(58) Field of Classification Search
 USPC ......................................................... 429/465
 See application file for complete search history.

(56) References Cited

U.S. PATENT DOCUMENTS

2013/0157169 A1\* 6/2013 Madden .............. H01M 4/8652
   429/482
2015/0140470 A1\* 5/2015 Razack ............... H01M 8/1004
   429/481

OTHER PUBLICATIONS

English translation of Nanba, JP 2010-251140 A, Nov. 2010, Japan.\*

\* cited by examiner

MEMBRANE ELECTRODE ASSEMBLY FOR A FUEL CELL, METHOD FOR PREPARING THE MEMBRANE ELECTRODE ASSEMBLY, FUEL CELL SYSTEM AND VEHICLE

BACKGROUND OF THE INVENTION

Field of the Invention

The invention relates to a membrane electrode assembly for a fuel cell. The membrane electrode assembly comprises a membrane, a catalyst layer and a gas diffusion layer. The catalyst layer has a first side facing the membrane and a second side facing the gas diffusion layer. An ionomer content increases in the catalyst layer towards the membrane. The invention further relates to a method for preparing such a membrane electrode assembly, to a fuel cell system with a fuel cell stack comprising a plurality of fuel cells, the fuel cells each comprising such a membrane electrode assembly, and to a vehicle.

Description of the Related Art

In a fuel cell system, fuel cells create electricity through the electrochemical reaction that takes place when a fuel such as hydrogen and an oxidant such as oxygen are passed across opposing sides of the membrane electrode assembly. In a polymer electrolyte membrane fuel cell (PEMFC) system the membrane is a polymer electrolyte membrane (PEM) or proton exchange membrane. The catalyst layers and the gas diffusion layers form the electrodes of the membrane electrode assembly, namely an anode and a cathode located on each side of the membrane.

In a fuel cell such membrane electrode assemblies are arranged between two separator plates, wherein one separator plate comprises channels for the distribution of the fuel and the other separator plate comprises channels for the distribution of the oxidant. The respective channels facing the membrane electrode assembly build a channel structure which is called a flow field.

In a fuel cell stack a plurality of such unit cells comprising two separator plates and the membrane electrode assembly arranged between the separator plates are often connected in series. In such a fuel cell stack instead of monopolar separator plates bipolar plates can be utilized, which are electrically conductive and contact an anode of the unit cell and a cathode of the adjacent unit cell.

US 2008/0206616 A1 describes a catalyst coated membrane for a fuel cell. Herein, a catalyst layer comprises smaller catalyst particles and larger catalyst particles on a polymer electrolyte membrane. The larger catalyst particles are proximal to a gas diffusion layer of the membrane electrode assembly, and the smaller catalyst particles are disposed between the larger catalyst particles and the polymer-electrolyte-membrane. The catalyst layer also comprises a polymer electrolyte ionomer. The ionomer concentration can vary along the depth of the catalyst layer. The catalyst layer can have a vertical or horizontal gradient, for example a porosity gradient, a particle size gradient or a catalyst particle concentration gradient. To produce the catalyst coated membrane, a first ink can be sprayed onto a polymer electrolyte membrane substrate, wherein the first ink composition can include catalyst particles and polymer electrolyte ionomer particles as functional materials. A second layer can be produced by spraying a second ink onto the surface of the at least partially dried first layer obtained from the first ink. The first and second inks can have different compositions, and each composition can include different functional materials such as a different catalyst particle composition or different concentrations of the functional materials.

US 2011/0027696 A1 describes a fuel cell with a membrane electrode assembly, wherein a first electrode layer of an electrode contains a smaller amount of ionomer than a second electrode layer. Herein the second electrode layer is closer to a polymer electrolyte membrane of the membrane electrode assembly and the first electrode layer is closer to a gas diffusion layer. A first gas diffusion layer faces a first bipolar plate of a fuel cell containing the membrane electrode assembly, and a second gas diffusion layer faces a second bipolar plate of the fuel cell.

It is an object of the present invention to provide a membrane electrode assembly of the initially mentioned kind, a method for preparing such a membrane electrode assembly, a fuel cell system and a vehicle, wherein the membrane electrode assembly provides an improved performance to a fuel cell in which it can be utilized.

BRIEF SUMMARY OF THE INVENTION

In the membrane electrode assembly according to the invention, the catalyst layer comprises a first sublayer in which catalyst particles are coated with a first ionomer and a second sublayer comprising a second ionomer. Herein, the second sublayer is closer to the membrane than the first sublayer. Further, pores are present at least between the coated catalyst particles. By such a structure, a through-plane gradient of the ionomer content can be achieved. A high ionomer content next to the membrane provides the catalyst layer with a good proton conduction capacity close to the membrane. On the other hand, the pores between the coated catalyst particles in the first sublayer lead to an elevated level of porosity next to the gas diffusion layer and in particular next to an (optional) microporous layer of the gas diffusion layer. Thus, a pore network can be maintained which is capable of providing an ample flux of a reactant within the first sublayer and also a good removal of used reactant and/or products of the electrochemical reaction taking place in the fuel cell. Thus, performance improvements under a variety of test conditions can be obtained.

By providing the first sublayer with the lower ionomer content and the second sublayer with the higher ionomer content, the utilization of the catalyst layer is improved. This is due to the fact that minimal protonic and mass transport requirements are met for a larger fraction of the catalyst layer. Both protons and reactant are able to migrate into greater portions of the catalyst layer thickness compared to catalyst layers not showing such a gradient. By providing the ionomer gradient within the catalyst layer comprising the first sublayer with the first ionomer and the second sublayer with the second ionomer also a good interface between the membrane and the catalyst layer is obtained.

The catalyst particles are items or units comprising a support material such as carbon and at least one noble metal such as platinum on the support material. The coating is a thin layer of the first ionomer on such particles. By providing such a coating or skin on the catalyst particles within the first sublayer, also an in-plane gradient exists in the catalyst layer. Such a gradient exists, for example, in a direction from the first sublayer to the second sublayer. This is due to the fact that the coating of the coated catalyst particles is thinner than an average size of the particles of the second ionomer present in the second sublayer. Performance and durability gains can be achieved as the first ionomer type resides next to the catalyst particles, whereas the second ionomer is present in the second sublayer of the catalyst layer.

The membrane electrode assembly thus provides an improved performance and an improved durability to a fuel cell in which the membrane electrode assembly is utilized. Further, the utilization of different ionomers within the catalyst layer provides an advantageous material processing flexibility: it is thus possible to combine ionomers with different chemical properties that would otherwise be incompatible for processing in the manufacturing of the membrane electrode assembly.

Further, the membrane electrode assembly provides an improved structural flexibility as a variety of pore structures can be engineered. The utilization of the first ionomer in the vicinity of the catalyst particles also enables the placement of additives in the vicinity of the catalyst particles. For example, additives that avoid or reduce carbon corrosion or platinum dissolution can be provided in the coating. This further improves the durability and the performance of the membrane electrode assembly. As an example, PITM additives can be utilized next to the catalyst particles, i.e. in the coating containing the first ionomer.

Preferably, within the first sublayer an average thickness of the coating is inferior to an average diameter of the catalyst particles. Thus, a very thin layer or skin of the first ionomer is present within the first sublayer of the catalyst layer. In combination with the pores or void spaces between the coated catalyst particles this leads to a high efficiency of the first sublayer in catalyzing the electrochemical reactions taking place within the catalyst layer. However, the thin coating of the first ionomer near the catalyst material also provides the first sublayer with good proton conductivity.

It has further proven advantageous if within the catalyst layer the coating of the coated catalyst particles avoids a contact between the second ionomer and the catalyst particles. Thus, the type and the chemical properties of the first ionomer can be particularly well adapted to the needs of the catalyst particles, whereas the choice of the type and the properties of the second ionomer does not need to take into account the properties of the catalyst particles. For example, a type of ionomer which would lead to a higher rate of crystallite dissolution within the first sublayer if in contact with the catalyst particles does not affect the catalyst particles if this type of ionomer is utilized for the second sublayer isolated from the catalyst particles by the coating. Therefore, the type of the second ionomer can be chosen in particular to provide the second sublayer with high proton conductivity.

Further advantageously, particles of different sizes of the second ionomer can be present in the second sublayer, wherein smaller particles of the second ionomer are located in at least some of the pores present in the first sublayer. Thus, the second ionomer penetrates into the first sublayer and there is no sharp limit between the two sublayers. This is particularly valuable for gradually increasing the proton conductivity in a direction from the second side of the catalyst layer to the first side of the catalyst layer. Thus, a particularly high proton conductivity is present near the membrane of the membrane electrode assembly. Also a particularly smooth change of the porosity within the catalyst layer can be obtained. It is noted, however, that the ionomer particle sizes may not change throughout the layer, but that their overall distribution may vary. Moreover, it is noted that the first side of the catalyst layer constitutes an interface between the catalyst layer and the membrane and the second side of the catalyst layer constitutes an interface between the catalyst layer and the gas diffusion layer.

It has further proven advantageous if the porosity of the catalyst layer increases from the first side towards the second side of the catalyst layer, i.e. away from the membrane toward the surface of the gas diffusion layer. Thus, a through-plane porosity gradient is obtained which leads to a particularly good reactant access to the catalyst particles within the catalyst layer. Also, products of the electrochemical reaction taking place in the catalyst layer can be particularly well removed from the catalyst layer.

The catalyst layer can in particular be a cathode catalyst layer. Here, the opportunity for PEMFC (polymer electrolyte membrane fuel cell) performance enhancement is particularly large. This is due to, for example, rather sluggish oxygen reduction reaction kinetics and oxygen mass transport in the cathode catalyst layer. Also, in the cathode catalyst layer water management is of particular relevance, as the product water is mainly present on the cathode side of the membrane electrode assembly. Thus, larger pores in the first sublayer which provide a good product water flux are of particular relevance in the cathode catalyst layer.

With respect to the two different ionomers present in the catalyst layer, in particular the acidity of the first ionomer can differ from that of the second ionomer. Thus, a thin layer of less acidic ionomer next to the catalyst particles provides sufficient proton conduction, but a particularly low rate of crystallite dissolution, i.e. of, for example, platinum dissolution. This is in particular advantageous for an improved durability of the membrane electrode assembly. On the other hand, a higher acidity of the first ionomer can provide better performance of the membrane electrode assembly in hot and dry conditions. Therefore depending on the applications the difference in acidity of the two ionomers can be chosen adequately.

Alternatively or additionally, a molecular mass per sulphonic acid group of the first ionomer can differ from that of the second ionomer. The molecular mass per sulphonic acid group is also called the equivalent weight of the ionomer. Therefore as well by varying the equivalent weight of the two ionomers, the properties of the catalyst layer can be tuned to satisfy the needs of the specific fuel cell application.

Still further, a composition of the first ionomer can differ from that of the second ionomer. For example, perfluorosulphonic acid (PFSA) ionomers can be utilized for the coating of the catalyst particles, whereas hydrocarbon based ionomers can be utilized in the second sublayer.

Moreover, the ionomer material used in this invention may not be a pure ionomer, but it may be a mixture of an ionomer and one or more polymers, instead. Suitable polymers are selected from the list comprising fluoropolymers, such as polyvinylidene difluoride (PVDF) and polytetrafluoroethylene (PTFE) and Teflon® AF, perfluorinated elastomers—in particular copolymers of hexafluoropropylene and vinylidene fluoride such as Tecnoflon® of Solvay Solexis S.p.A.—, perfluoropolyethers, polyaromatic polymers such as polyethersulfones, siloxanic polymers, polybenzimidazole, etc., as well as mixtures or combinations thereof. The use of ionomer/polymer mixtures instead of pure ionomer materials provides the option to finetune the properties of the ionomer material used, e.g. in terms of chemical properties and concentration of the ionomer, hence the amount of ionomer present in a catalyst layer. This is advantageous, e.g. for durability and/or performance of a membrane electrode assembly. The ionomer/polymer mixture can contain polymer up to 50% by weight of the mixture. Preferably, the mixture contains polymer between 0.1 an 30% by weight of the mixture.

Further advantageously, the first sublayer can be obtained by mixing a powder containing the catalyst particles with the first ionomer, wherein the catalyst layer is obtained by application of an ink containing the second ionomer onto the at least partially consolidated first sublayer. Thus, it can particularly easily be achieved that the second ionomer flows or penetrates into the first sublayer and therefore a porosity gradient with increasing porosity from the second sublayer to the first sublayer is realized.

In the method according to the invention, for preparing the membrane electrode assembly according to the invention, in a first step of the preparation of the catalyst layer a powder containing the catalyst particles is mixed with the first ionomer to obtain the first sublayer. In a second step of the preparation of the catalyst layer, an ink containing the second ionomer is applied onto the at least partially consolidated first sublayer to obtain the second sublayer. Thus, a localized ionomer type in the form of the first ionomer is provided near the catalyst surface compared to the overall ionomer content in the bulk catalyst layer. By first depositing a first type of ionomer near the catalyst particles (also called first deposition) and then applying the second ionomer as a binder (also called second deposition), ionomer and porosity gradients throughout and within the thickness of the catalyst layer can be obtained. This provides an improved performance to the fuel cell utilizing the prepared membrane electrode assembly.

The fuel cell system according to the invention, which in particular can be employed in a vehicle, includes a fuel cell stack comprising a plurality of fuel cells. Each fuel cell comprises a membrane electrode assembly according to the invention, and each membrane electrode assembly is arranged between a first separator plate and a second separator plate. Within each fuel cell the membrane electrode assembly comprises the membrane and cathode and anode electrodes, respectively. The cathode and anode electrodes each comprise a catalyst layer and a gas diffusion layer. Preferably at least the cathode catalyst layer comprises the two sublayers.

Such a fuel cell system can include a plurality of further components usual in particular for fuel cell systems of vehicles, which presently do not have to be explained in detail.

The vehicle according to the invention includes a fuel cell system according to the invention.

The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures or explained, but arise from and can be generated by separated feature combinations from the explained implementations.

BRIEF DESCRIPTION OF THE SEVERAL VIEWS OF THE DRAWINGS

Further advantages, features and details of the invention are apparent from the claims, the following description of preferred embodiments as well as based on the drawings. Therein show:

DETAILED DESCRIPTION OF THE INVENTION

Figure 1:
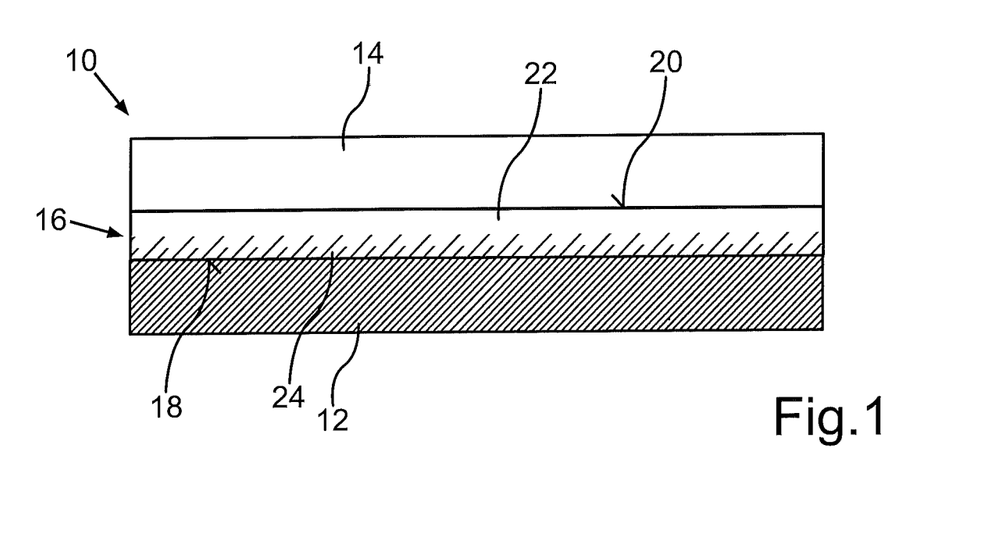
FIG. 1 schematically a part of a membrane electrode assembly comprising a gas diffusion layer, a catalyst layer and a membrane, wherein within the catalyst layer there is an increasing porosity towards the gas diffusion layer and an increasing ionomer content towards the membrane.

FIG. 1 schematically shows a part of a membrane electrode assembly 10 for a fuel cell. The membrane electrode assembly 10 comprises a membrane 12. The membrane 12 is a polymer electrolyte membrane (PEM) or proton exchange membrane. The membrane electrode assembly 10 also comprises a gas diffusion layer 14. A catalyst layer 16 is arranged between the membrane 12 and the gas diffusion layer 14. The catalyst layer 16 has a first side 18 facing the membrane 12 and a second side 20 facing the gas diffusion layer 14. The second side 20 can in particular be in contact with a microporous layer or structure of the gas diffusion layer 14. The gas diffusion layer 14 has an overall high porosity which facilitates the access of reactant gases such as hydrogen or oxygen to the catalyst layer 16. The membrane 12 on the other hand has a high proton conductivity.

Within the catalyst layer 16, there is an increasing porosity towards the gas diffusion layer 14. Further, an ionomer content increases towards the membrane 12. By these gradient structures, i.e. the porosity gradient towards the gas diffusion layer 14 and the ionomer gradient towards the membrane 12, both good proton conductivity as well as ample reactant flux is provided by the catalyst layer 16. As oxygen mass transport and product water management are particularly important in a fuel cell comprising the membrane electrode assembly 10, the catalyst layer 16 can in particular be a cathode catalyst layer 16. However, the membrane electrode assembly 10 comprises a second catalyst layer (not shown) opposite the catalyst layer 16 shown in FIG. 1. This second catalyst layer, which can in particular be an anode catalyst layer, is also arranged between the membrane 12 and a further gas diffusion layer (not shown).

Figure 2:
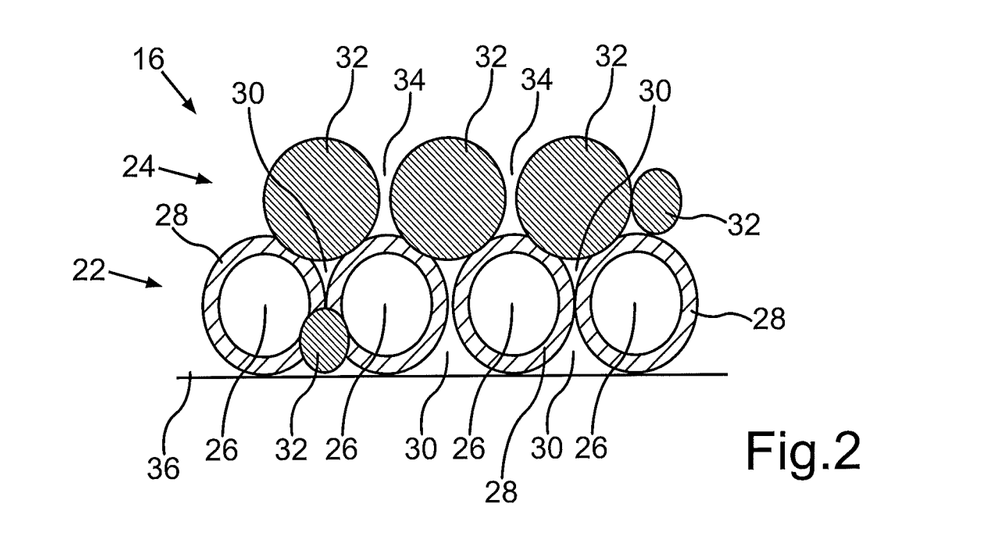
FIG. 2 schematically the catalyst layer according to FIG. 1, wherein a first ionomer in the form of a coating is present in close proximity to particles of a catalyst powder, the coated catalyst particles forming a first sublayer within the catalyst layer, and wherein a second ionomer forms a second sublayer within the catalyst layer.

In order to provide the porosity gradient and the ionomer gradient within the catalyst layer 16, the catalyst layer 16 comprises a first sublayer 22 and a second sublayer 24 (see FIG. 2). In the first sublayer 22, catalyst particles 26 are coated with a first ionomer 28. The catalyst particles 26 are separate particles of a catalyst powder. The first ionomer 28 coating forms a thin layer or skin around the catalyst particles 26. The catalyst particles 26 consist of noble metals such as platinum on a support such as carbon. There are spaces or pores 30 between the coated catalyst particles 26 which provide the first sublayer 22 with a relatively high porosity.

As the first ionomer 28 covers each catalyst particle 26 circumferentially, the first ionomer 28 type is in very close proximity to the catalyst powder. This allows to utilize a polymer as first ionomer 28, which is particularly well adapted to provide the catalyst layer 16 with improved durability. For example, an acidity of the first ionomer 28 which forms the thin coating or skin on the catalyst particles 26 can be lower than the acidity of particles of the second ionomer 32 which is present in the second sublayer 24. This improves the durability of the catalyst layer 16 as the less acidic first ionomer 28 leads to a particularly low rate of platinum dissolution and still provides sufficient proton conduction to the catalyst layer 16. Further, additives for example additives to avoid or reduce carbon corrosion and/or platinum dissolution can be easily placed at a specific location within the catalyst layer 16, namely in close contact with the catalyst particles 26, by providing the first ionomer 28 with such additives.

There are also pores 34 or void spaces between the particles of the second ionomer 32, but still the porosity of the catalyst layer 16 decreases towards the membrane 12. Also, the overall ionomer content increases within the catalyst layer 16 in a direction from the second side 20 to the first side 18.

To provide the catalyst layer 16 comprising the first sublayer 22 and the second sublayer 24 the catalyst particles 26 are coated in a first step of the preparation of the catalyst layer 16. This can be done by spray-coating or by mixing a powder containing the catalyst particles 26 with the first ionomer 28. After formation of the first sublayer 22, for example on a substrate 36, the second ionomer 32 is applied to the first sublayer 22 in order to form the second sublayer 24. During this application process smaller particles of the second ionomer 32 can penetrate or flow into some of the pores 30 provided within the first sublayer 22 (see FIG. 2). Thus, a very gradual increase in porosity in a direction from the first side 18 of the catalyst layer 16 to the second side 20 of the catalyst layer 16 (see FIG. 1) can be achieved.

The second ionomer 32 can in particular be of a more acidic type than first ionomer 28 in order to provide the second sublayer 24 with increased proton conductivity, in particular close to the membrane 12. By tuning the conditions of the application process of the second ionomer 32 onto the first sublayer 22, which can in particular be performed by spray-coating, the ionomer gradient and the penetration of the second ionomer 32 into the first sublayer 22 can be regulated. Also, the interface between the catalyst layer 16 and the membrane 12 can be improved.

Further, by providing the first ionomer 28 as a coating on the catalyst particles 26, an in-plane gradient of the ionomer content within the catalyst layer 16 is achieved. The through-plane and/or in-plane ionomer content and/or ionomer type gradient lead to performance and durability gains.

The catalyst layer 16 can also have a through-plane and/or an in-plane porosity gradient. In the example shown in FIG. 1 and FIG. 2, the porosity increases towards the gas diffusion layer 14.

Figure 3:
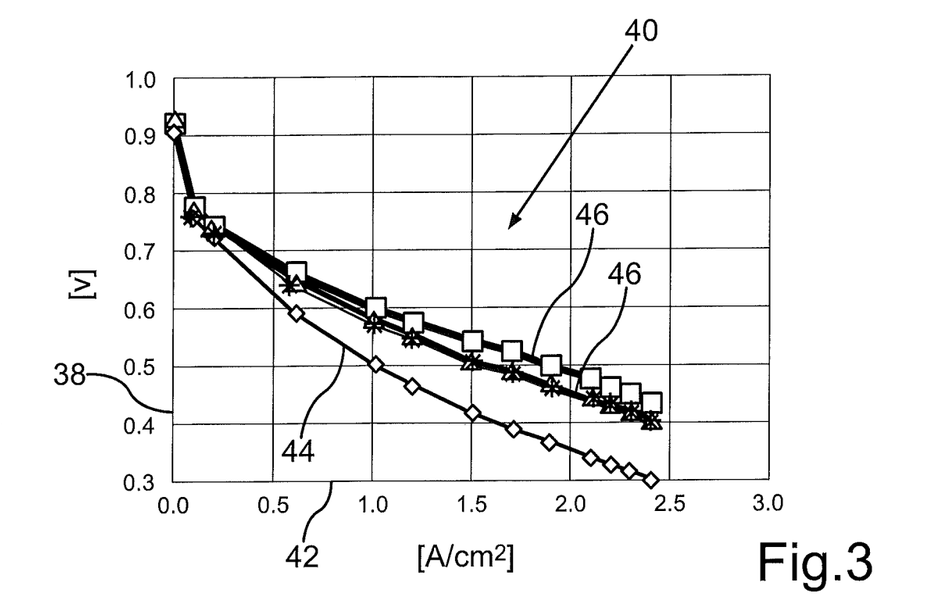
FIG. 3 a graph showing performance improvements due to the coating of the catalyst particles with the first ionomer in normal temperature operation.

The performance improvement is, for example, illustrated in FIG. 3. Herein, a cell voltage of a single fuel cell is indicated on an ordinate 38 of a graph 40. The current density is indicated on an abscissa 42 of the graph 40. In the graph 40 a first curve 44 shows the polarization characteristics of a fuel cell not having the ionomer coating on the catalyst particles 26. Other curves 46 show the results obtained with the membrane electrode assembly 10 shown in FIG. 1.

As can be seen from FIG. 3, higher cell voltages are obtained with the membrane electrode assembly 10 having the described structure. This in particular true for higher current densities. The curves 46 show the results for different quantities of ionomer loadings, wherein the ionomer has the same equivalent weight in the different loadings. The graph 40 in FIG. 3 shows the results in normal temperature operating conditions of the fuel cell, for example in a temperature range between 65° C. and 70° C.

Figure 4:
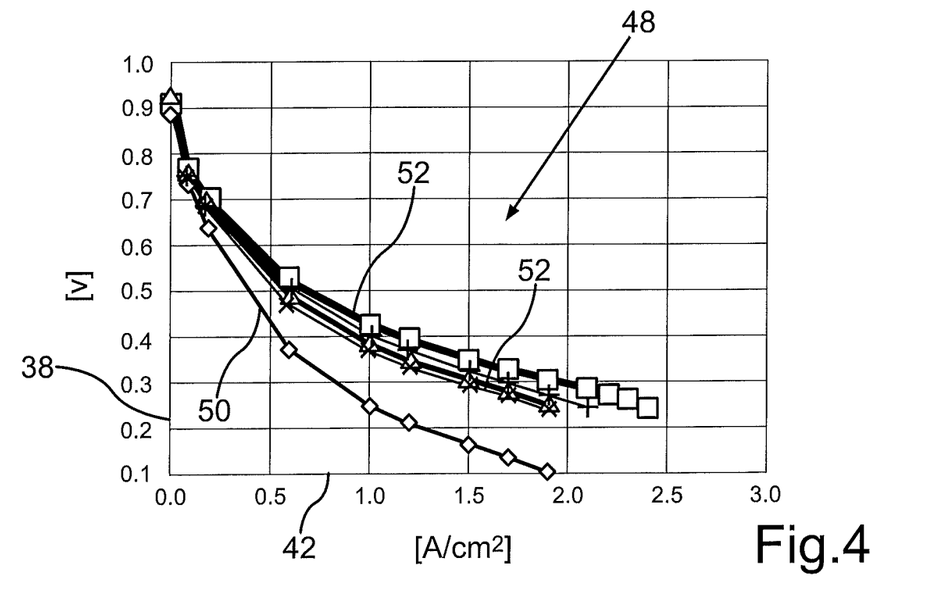
FIG. 4 a graph showing performance improvements due to the coating of the catalyst particles with the first ionomer in hot temperature operation.

A graph 48 shown in FIG. 4 also shows polarization curves, but in this case in hot operating conditions of the fuel cell of for example about 80° C. Again, a curve 50 shows the base line polarization, wherein other curves 52 show the performance improvement obtained by the utilization of the membrane electrode assembly 10 shown in FIG. 1. Again, performances above base line levels are obtained with respect to the cell voltage for a given current density.

Figure 5:
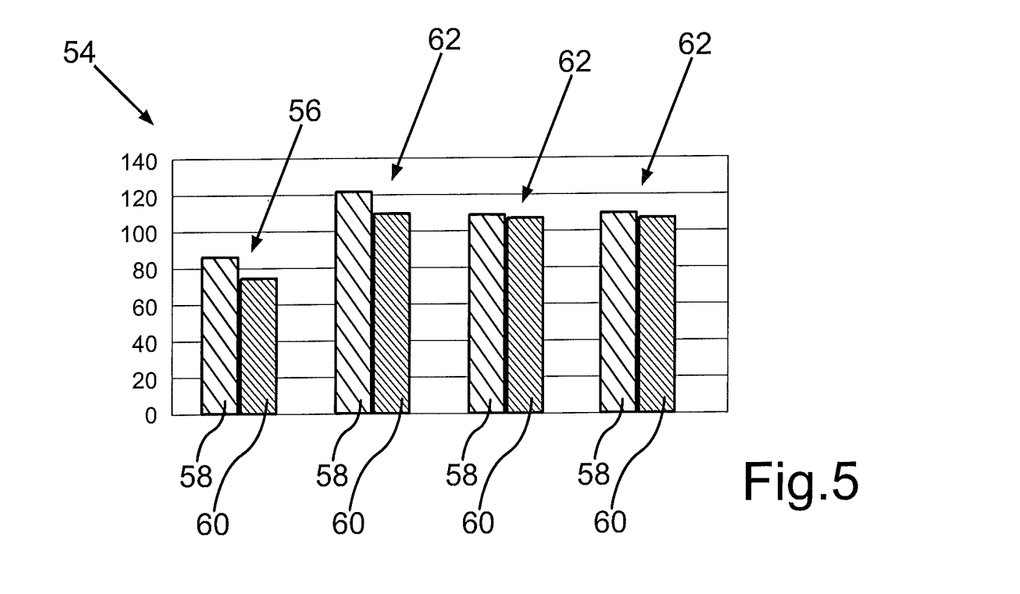
FIG. 5 a diagram showing an improvement of the effective catalyst surface area due to the coating of the catalyst particles with the first ionomer.

In a diagram 54 shown in FIG. 5, a first pair of columns 56 visualizes the base line effective platinum surface area for wet conditions 58 and dry conditions 60. Further pairs of columns 62 show that the addition of the ionomer spray leads to an effective platinum dissolution surface area beyond base line levels at the same loading. The further columns 62 show the results for different amounts of ionomer sprays.

Figure 6:
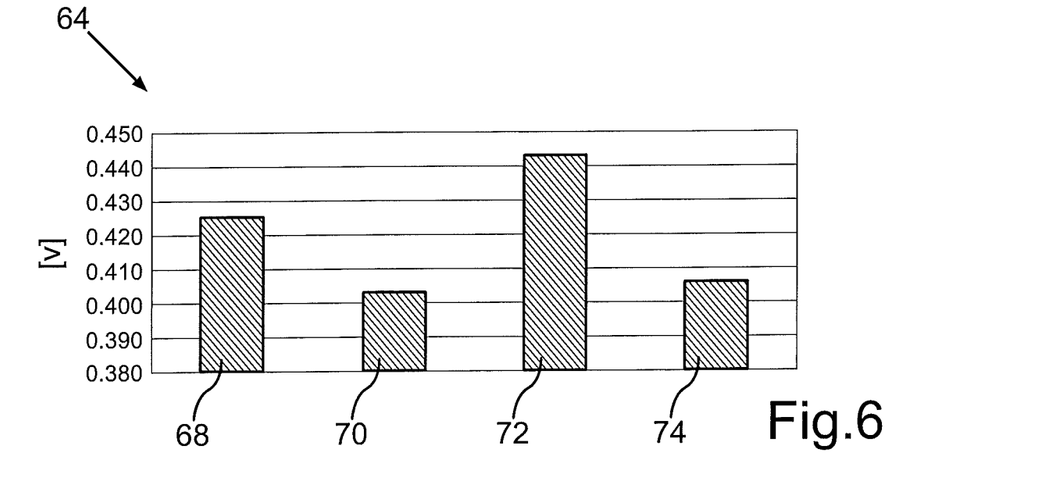
FIG. 6 a graph showing the performance improvement due to different types and amounts of the first ionomer applied to the catalyst particles.

A further diagram 64 shown in FIG. 6 illustrates the influence of different spraying conditions and of different ionomer equivalent weights on the cell voltage obtained for a given current density, for example for a current density of 1.9 A/cm$^2$. The cell voltage is indicated on an ordinate 66 in the diagram 64. A first column 68 is the result obtained with an ionomer spray having the same composition as the one which yields the results shown in a second column 70. However, the amount of ionomer spray utilized for the column 70 sample is higher and there is a deeper penetration of the ionomer spray. A further column 72 shows the results obtained with the same amount of ionomer spray as in the column 70 sample, but with an ionomer having a lower equivalent weight. Finally, a fourth column 74 shows the results for the base line.

Figure 7:
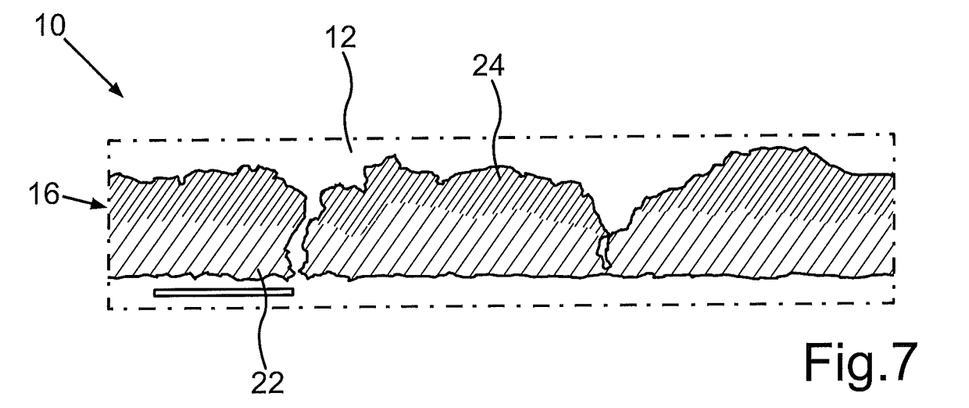
FIG. 7 a scanning transmission X-ray microscopy image of a membrane electrode assembly according to FIG. 1.

FIG. 7 is a scanning transmission X-ray microscopy image of the membrane electrode assembly 10 shown in FIG. 1. As can be seen from this image, the membrane 12 does not have a flat, but a cragged surface on which the catalyst layer 16 is located. Also, it is evident that there is no sharp border between the first sublayer 22 and the second sublayer 24. However, the gradient in the ionomer content is present, which increases from the membrane 12 towards the gas diffusion layer 14 (not shown in FIG. 7).

Figure 8:
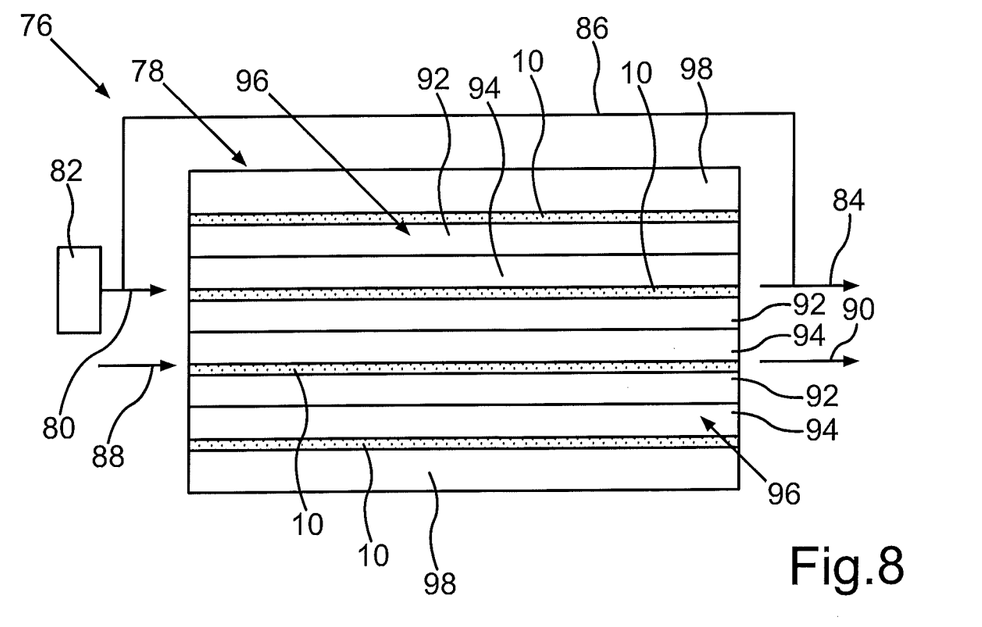
FIG. 8 schematically a fuel cell system with a fuel cell stack comprising the membrane electrode assemblies according to FIG. 1.

FIG. 8 schematically shows a fuel cell system 76 of a vehicle. The fuel cell system 76 comprises a fuel cell stack 78 to which fuel such as hydrogen is provided via a supply line 80. The fuel can be stored in a tank 82. Upon leaving the fuel cell stack 76 via an exhaust line 84 any fuel remaining in the exhaust gas can be recirculated to the fuel cell stack 76 via a recirculation line 86. The fuel is provided to anode electrodes of the membrane electrode assemblies 10. In a like manner an oxidant such as air is provided via a supply line 88 to cathode electrodes of the membrane electrode assemblies 10. The exhaust air leaves the fuel cell stack 76 via a further exhaust line 90.

The anode electrodes and the cathode electrodes of the membrane electrode assemblies 10 each comprise the catalyst layer 16 and the gas diffusion layer 14 (see FIG. 1). The electrochemical reaction which creates electrical energy takes place when the fuel and the oxidant are passed across opposing sides of the membrane electrode assemblies 10.

The membrane electrode assemblies 10 are arranged between a first separator plate in the form of an anode plate 92 and a second separator plate in the form of a cathode plate 94. The anode plate 92 faces the anode electrode of the membrane electrode assembly 10 of a unit cell. The cathode plate 94 faces the cathode electrode of the membrane electrode assembly 10 of this unit cell. The anode plate 92 of a first unit cell and the cathode plate 94 of an adjacent unit cell can form a bipolar plate assembly 96, in which the two plates 92, 94 are joined together. The outermost electrode assemblies 10 in the fuel cell stack 78 are not sandwiched between two bipolar plate assemblies 96, but between one bipolar plate assembly 96 and an end plate 98.

The plates 92, 94 joined together in the bipolar plate assembly 96 preferably form a coolant flow field (not shown), i.e. a channel structure for a coolant fluid which removes heat generated by the electrochemical reaction taking place in the membrane electrode assemblies 10. Further the plates 92, 94 form reactant flow fields for the fuel and the oxidant respectively, i.e. for the reactants which are provided to the anode electrodes and to the cathode electrodes of the membrane electrode assemblies 10.

The fuel cell system (76) may comprise further conventional components, such as a humidifier, a compressors, heat exchangers, etc. Such components are know to a person skilled in the art. Thus, for the sake of clarity and simplicity, they are not illustrated in FIG. 8.

The invention claimed is:

1. A membrane electrode assembly for a fuel cell, comprising
    a membrane (12),
    a catalyst layer (16) and
    a gas diffusion layer (14),
    wherein the catalyst layer (16) has a first side (18) facing the membrane (12) and a second side (20) facing the gas diffusion layer (14),
    wherein in the catalyst layer (16) an ionomer content increases towards the membrane,
    wherein the catalyst layer (16) comprises
        a first sublayer (22) in which supported catalyst particles (26) are coated with a first ionomer (28), and
        a second sublayer (24) comprising particles of a second ionomer (32) free of catalyst, the second sublayer (24) being closer to the membrane (12) than the first sublayer (22), the first sublayer (22) being closer to the gas diffusion layer (12) than the second sublayer (24),
    wherein pores (30) are present at least between the coated catalyst particles (26) and also between the particles of the second ionomer (32),
    wherein a porosity of the catalyst layer (16) increases from the first side (18) towards the second side (20) of the catalyst layer (16), and
    wherein the first and/or the second ionomer is/are a mixture of an ionomer and one or more polymers.

2. The membrane electrode assembly according to claim 1, wherein within the first sublayer (22) an average thickness of the coating is inferior to an average diameter of the catalyst particles (26).

3. The membrane electrode assembly according to claim 1, wherein within the catalyst layer (16) the coating of the coated catalyst particles (26) avoids a contact between the second ionomer (32) and the catalyst particles (26).

4. The membrane electrode assembly according to claim 1, wherein the acidity and/or the molecular mass per sulfonic acid group and/or a composition of the first ionomer (28) differs from that of the second ionomer (32).

5. The membrane electrode assembly according to claim 1, wherein the mixture of an ionomer and one or more polymers contains a polymer selected from the list comprising fluoropolymers, perfluorinated elastomers, perfluoropolyethers, polyaromatic polymers, as well as mixtures or combinations thereof.

6. The membrane electrode assembly according to claim 1, wherein the first sublayer (22) is obtained by mixing a powder containing the catalyst particles (26) with the first ionomer (28), wherein the catalyst layer (16) is obtained by application of an ink containing the second ionomer (32) onto the at least partially consolidated first sublayer (22).

7. The membrane electrode assembly according to claim 1, wherein the membrane electrode assembly (10) is prepared by a method comprising:
    in a first step of the preparation of the catalyst layer (16) mixing a powder containing the catalyst particles (26) with the first ionomer (28) to obtain the first sublayer (22), and
    in a second step, applying an ink containing the second ionomer (32) onto the at least partially consolidated first sublayer (22) to obtain the second sublayer (24).

8. A fuel cell system, with a fuel cell stack (78) comprising a plurality of fuel cells, wherein each fuel cell comprises a membrane electrode assembly (10) according to claim 1, and wherein each membrane electrode assembly (10) is arranged between a first separator plate (92) and a second separator plate (94).

9. A vehicle with a fuel cell system (76) according to claim 8.

10. The membrane electrode assembly according to claim 1, wherein a porosity of the cathode catalyst layer (16) increases from the first side (18) towards the second side (20) of the catalyst layer (16).

11. The membrane electrode assembly according to claim 5, wherein the fluoropolymer is selected from polyvinylidene difluoride, polytetrafluoroethylene and Teflon® AF, wherein the perfluorinated elastomer is selected from copolymers of hexafluoropropylene and vinylidene fluoride, and wherein the polyaromatic polymer is selected from polyethersulfones, siloxanic polymers, and polybenzimidazole.

* * * * *